(12) United States Patent
Glasbrenner

(10) Patent No.: US 6,994,909 B2
(45) Date of Patent: *Feb. 7, 2006

(54) ISOCYANATE-BASED LAMINATING ADHESIVES

(75) Inventor: Brian S. Glasbrenner, Brooklyn Park, MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 74 days.

This patent is subject to a terminal disclaimer.

(21) Appl. No.: 10/465,244

(22) Filed: Jun. 20, 2003

(65) Prior Publication Data

US 2003/0215646 A1    Nov. 20, 2003

Related U.S. Application Data

(62) Division of application No. 09/042,735, filed on Mar. 17, 1998, now Pat. No. 6,617,031, which is a division of application No. 08/651,648, filed on May 22, 1996, now abandoned.

(51) Int. Cl.
*B32B 27/40* (2006.01)
*B32B 27/00* (2006.01)
*C09J 175/06* (2006.01)
*C09J 175/08* (2006.01)
*C09J 175/04* (2006.01)

(52) U.S. Cl. .............................. 428/423.1; 156/331.4; 156/331.7; 206/813; 428/311.71; 428/319.3; 428/423.5; 428/423.7; 428/424.2; 428/424.4; 428/424.6; 428/424.8; 428/425.1; 428/425.8; 528/66; 528/76; 528/80; 528/83; 528/905

(58) Field of Classification Search ............. 156/331.4, 156/331.7; 206/813; 428/423.1, 423.5, 428/423.7, 424.2, 424.4, 424.6, 424.8, 425.1, 428/425.8, 311.71, 319.3; 528/66, 76, 80, 528/83, 905

See application file for complete search history.

(56) References Cited

U.S. PATENT DOCUMENTS

| 3,915,935 | A | * | 10/1975 | Abraham et al. ............. 528/66 |
| 4,280,979 | A | * | 7/1981 | Dunleavy et al. ........... 264/157 |
| 4,486,508 | A | * | 12/1984 | Coughlin et al. ........... 428/480 |
| 4,487,909 | A | * | 12/1984 | Coughlin et al. ............ 528/60 |
| 4,994,540 | A | * | 2/1991 | Boerner et al. .............. 528/44 |
| 5,278,223 | A | * | 1/1994 | Gruenewaelder et al. ... 524/502 |
| 6,617,031 | B1 | * | 9/2003 | Glasbrenner ............. 428/423.1 |

FOREIGN PATENT DOCUMENTS

EP    590398    *    4/1994

* cited by examiner

Primary Examiner—Rabon Sergent

(57) ABSTRACT

The invention relates to a laminating adhesive including a reaction product of at least one polymeric polyol (part A) and at least one NCO terminated polyurethane prepolymer (part B). The part A includes a reaction product of at least one alkylene diol; at least one dial containing a pendant aliphatic chain; and at least one dicarboxylic acid. The part B includes a reaction product of at least one polyether polyol; and at least one polyisocyanate. The adhesive exhibits an initial viscosity of less than about 25,000 mPa.s at about 25° C.

19 Claims, No Drawings

ISOCYANATE-BASED LAMINATING ADHESIVES

This application is a division of application Ser. No. 09/042,735 filed Mar. 17, 1998, now U.S. Pat. No. 6,617,031, which is a division of application Ser. No. 08/651,648 filed May 22, 1996, abandoned.

FIELD OF THE INVENTION

The invention relates to solventless laminating adhesives, specifically to isocyanate-based formulations having enhanced processing characteristics at reduced temperatures.

BACKGROUND OF THE INVENTION

It is known that isocyanate-based formulations are useful laminating adhesives for flexible packaging. The solventless formulations, which consist of a polyol (part A) and an NCO-terminated polyurethane prepolymer (part B), are meter-mixed immediately before the laminating process and used to adhere superposed layers of one or more materials. For example, European Patent Application # 93114668.2 discloses such formulations wherein the part A and part B components are meter-mixed at temperatures between 20° C. and 50° C.

A drawback in this prior art reference is the formulation's initial viscosity. The formulations, which have initial viscosities greater than 25,000 mPa·s at 25° C.+/−5.0° C., are difficult to process.

Therefore, there remains a need for solventless isocyanate-based laminating adhesives having enhanced processing characteristics at reduced temperatures.

SUMMARY OF THE INVENTION

The present invention is directed to solventless isocyanate-based formulations, which are useful as laminating adhesives for flexible packaging, comprising the reaction product of:
A) at least one polymeric polyol (part A) comprising;
  1) at least one alkylene diol;
  2) at least one diol containing a pendant aliphatic chain;
  3) at least one dicarboxylic acid; with
B) at least one NCO-terminated polyurethane prepolymer (part B) comprising;
  1) at least one polymeric polyol; and
  2) at least one polyisocyanate.

The part A components which have viscosities less than about 12,000 mPa·s at 25° C.+/−5.0° C. improve the meter-mix process, through enhanced flow rates, without the addition of heat.

Surprisingly, the formulations of the present invention have initial viscosities less than about 25,000 mPa·s at 25° C.+/−5.0° C. These properties enhance safety and simplify processing on conventional meter-mix units. For example, combining the part A and part B components without additional heat reduces worker exposure hazards to volatile isocyanates present in the part B component. Although distillation methods can reduce the volatile isocyanates present in the part B component to less than about 0.1% by weight, the small quantities which remain can still generate safety hazards when heated.

The present invention further comprises a method wherein the adhesive formulations are processed on laminator units at temperatures of about 75° C. and line speeds from about 200 meters/min. to about 500 meters/min. Lower temperatures are preferred during the solventless laminating process. For example, elevated temperatures accelerate the isocyanate/hydroxyl reaction to generate viscous materials. Viscous materials tend to mist on solventless laminators which are run at high line speeds. Misting is a phenomenon wherein adhesive droplets are thrown into the air generating safety hazards and non-uniform coat weights. The inventive formulations can be processed, on solventless laminators without misting, at temperatures of less than about 75° C. and line speeds from about 200 meters/min. to about 500 meters/min.

The adhesive formulations have good adhesion characteristics on substrates such as wood, metal, plastic and synthetic polymers. Examples include paper, polyethylene, polypropylene, polyester, nylon, wood, ethylene vinyl acetate, cellophane, polyvinyl chloride, surlyn, aluminum and metallized films.

Said formulations are particularly useful film to film laminating adhesives in durable-goods applications and applications having indirect food contact.

DETAILED DESCRIPTION OF THE INVENTION

At least one low molecular weight alkylene diol is used in the preparation of the part A component. The alkylene diols have hydroxyl numbers, as determined by ASTM designation E-222-67 (Method B), in a range from about 130 to about 1250, and preferably from about 950 to about 1250. Suitable examples include ethylene glycol, 1,3-propanediol, 1,4-butanediol, 1,5-pentanediol, 1,6-hexanediol, 1,8-octanediol, 1,4-bis-(hydroxymethyl)-cyclohexane, furan dimethylol, and mixtures thereof. Preferred alkylene diols are 1,4-butanediol, 1,6-hexanediol and mixtures thereof. The diols are present in a range from about 5.0% by weight to about 25.0% by weight, and preferably from about 10.0% by weight to about 20.0% by weight, based on 100 parts total part A solids.

Low molecular weight polyols containing alkoxy groups may be used in the preparation of the part A component. Suitable examples include diethylene glycol, polyethylene ether glycol, polypropylene ether glycols, polytetramethylene ether glycols and their mixtures. The polyols can have hydroxyl numbers in a range from about 130 to about 1250, and preferably from about 950 to about 1250 and can be present in the part A component in a range from about 5.0% by weight to about 50.0% by weight, and preferably from about 10.0% by weight to about 40.0% by weight, based on 100 parts total part A solids.

A least one low molecular weight diol component containing a pendant aliphatic chain are used in the preparation of the part A component. The term "pendant" is defined as a hydrophobic group which extends from the polymer chain. The diols can have hydroxyl numbers in a range from about 130 to about 1250, and preferably from about 950 to about 1250. Examples include 1,2-propanediol, 1,2-butanediol, 1,3-butanediol and 2,3-butanediol, 2,2-methyl-1,3-propanediol, 2,2,4-trimethyl-1,3-pentanediol, neopentyl glycol, 2-butyl-2-ethyl-1,3-propanediol and bis-2-hydroxyethyl lauramide and 1,2-dodecanediol. The diols can be present in the part A component in a range from about 5.0% by weight to about 50.0% by weight, and preferably from about 10.0% by weight to about 40.0% by weight, based on 100 parts total part A solids. It is surmised that some of the adhesive formulations' unique properties can be attributed to the pendant aliphatic chains present in the part A component.

Higher functional polyols may be used in the preparation of the part A component. Suitable examples include glycerol, trimethylolpropane, 1,2,4-butane triol, 1,2,6-hexane triol and mixtures thereof. The preferred higher functional polyols are glycerol and trimethylolpropane. Said polyols may be present in a range from about 1.0% by weight to about 15.0% by weight, and preferably from about 5.0% by weight to about 10.0% by weight, based on 100 parts total part A solids.

At least one polycarboxylic acid component is used in the preparation of the part A component. The polycarboxylic acid may be aliphatic, cycloaliphatic, aromatic and mixtures thereof. Suitable examples include oxalic acid, malonic acid, succinic acid, glutaric acid, adipic acid, pimelic acid, suberic acid, azelaic acid, sebacic acid, maleic acid, fumaric acid, phthalic acid, isophthalic acid, terphthalic acid, diethyl succinic acid and 1,4-cyclohexane dicarboxylic acid. The preferred polycarboxylic acid components are adipic acid, isophthalic acid and mixtures thereof. The polycarboxylic acids can be present in the part A component in a range from about 50.0% by weight to about 85.0% by weight, and preferably from about 50.0% by weight to about 70.0% by weight, based on 100 parts total part A solids.

The resulting polymeric polyols, which are the condensates of said polyhydroxyl and polycarboxylic acid components previously described, have viscosities less than about 12,000 mPa·s at 25° C. Suitable available polymeric polyols include Rucoflex® XF-5604-210 which is a polyester polyol from Ruco Corporation (Hicksville, N.Y.) based on adipic acid, isophthalic acid, glycerol, 1,6-hexanediol and neopentyl glycol. It is surmised that multibranched polymeric polyols (i.e., aliphatic pendant chains) reduce the crystalline nature of the part A component enhancing its flow characteristics at reduced temperatures. The effects of chain branching on polymer viscosity is described in "Polymer Process Engineering", Eric A. Grulke, chapter 8, pp 363–440, Prentice-Hall, N.J., 1994.

If desired, polymeric polyols free of pendant aliphatic chains may be used in combination with the polymeric polyols previously described. The materials are blended in such proportions that the resulting hydroxyl value is about 140 mg KOH/grams material and their viscosities are about 12,000 mPa·s at 25° C. The polymeric polyols, which are free of pendant aliphatic chains, include polyester polyols, polyether polyols, polyesterether polyols and mixtures thereof. A suitable example includes Rucoflex® S-1011-55 which is a polyesterether polyol based on adipic acid and diethylene glycol.

Additionally, small quantities of organic amine catalysts may be used to accelerate the hydroxyl/isocyanate reaction. The amine catalysts can be present in a range from about 0.05% by weight to about 2.0% by weight, and preferably from about 0.13% by weight to about 0.15% by weight, based on 100 parts total part A solids. An example includes Dabco® 33-LV from Air Products and Chemicals, Inc. (Allentown, Pa.) which is 1,4-diazobicyclooctane triethene-amine.

The NCO-terminated polyurethane prepolymers (part B) are prepared by methods known in the art. For example, a stoichiometric excess of diisocyanate is reacted with a polymeric polyol. The polyisocyanate can be selected from the group consisting of linear aliphatic, branched aliphatic, cyclic aliphatic, aromatic and mixtures thereof. The polymeric polyols can be polyester polyols, polyether polyols, polyesterether polyols and mixtures thereof. The reactants are in such proportions that the resulting percent isocyanate is in a range from about 5.0% by weight to about 10.0% by weight, and preferably from about 7.0% by weight to about 8.0% by weight, based on 100 part total part B solids. The resulting part B component can have viscosities less than about 25,000 mPa·s at 25° C.+/−5.0° C. and residual isocyanate monomer less than about 0.1% by weight. A suitable part B component includes Airthane® PPT-65 L from Air Products and Chemicals Inc. (Allentown, Pa.) which is based on toluene diisocyanate and polypropylene glycol.

The polymeric polyol (part A) and the NCO-terminated polyurethane prepolymer (part B) are blended together, immediately before the laminating process, without additional heat. The equivalence ratio of hydroxyl component (part A) to isocyanate component (part B) are in a range from about 1.0:1.0 to about 1.0:1.8, and preferably from about 1.0:1.2 to about 1.0:1.6.

The part A and part B components are blended together using conventional meter-mix equipment. An example is the twin mixer machine type CTF from Liquid Control Corporation (North Canton, Ohio). The unit can meter and dispense, the formulations described in the present invention, using mix ratios of 1:1 to about 30:1 and can have flow rates from about 150 cu.cms./min. to about 360 cu.cms./min. using air pressures from about 2.8 kg/sq.cm. to about 5.624 kg/sq.cm.

The isocyanate-based laminating adhesive formulations are dispensed onto rollers, within the solventless laminating unit, which have been heated to about 70° C. A suitable solventless laminator is the PCMC F-100 coater/laminator from Paper Converting Machine Company (Greenbay, Wis.). Said formulations are roll coated onto a primary substrate at a line speed from about 200 meters/min. to about 500 meters/min. and then mated with a secondary film using a combining nip from about 1.0 kg/sq.cm. to about 70 kg/sq.cm.

The present invention is further illustrated by the following non-limiting examples.

The following test methods were used:

Initial Viscosity Testing

The adhesive formulations were heated to 70° C., to simulate laminating conditions, and tested with a Brookfield viscometer-model RTV from Brookfield Engineering Laboratories, Inc. (Stoughton, Mass.) using spindle #27 at 50 rpm.

Rheology Testing

Viscosity profiles were evaluated on a Physica Rheometer-model UM from Paar Physica Company (Edison, N.J.). The rheometer had a 25 millimeter diameter test fixture and was run at a constant stress using the parallel plate method.

Peel Adhesion

Laminates were aged for 1, 3 and 7 days then cut into 2.54 cm. by 20.32 cm. strips. The strips were tested for 180° peel values on a friction/peel tester (model 225-1) from Thwing-Albert Instruments Company (Philadelphia, Pa.) using a crosshead speed of 30.48 cm./min.

EXAMPLES

Example 1 describes the flow characteristics of a blend of polymeric polyols (part A).

To a dry container was charged 47.93 grams (0.05 hydroxyl equivalence) Rucoflex® XF-5752-65, 51.93 grams (0.19 hydroxyl equivalence) Rucoflex® XF-5604-210 and 0.14 grams Dabco® 33-LV. The polyester blend had a viscosity of 11,500 mPa·s at 25° C.

Example 2 describes an isocyanate-based formulation and its rheological properties.

To a dry container was charged Airthane® PPT-65L (part B) and the part A component described in Example 1. The formulation, using a mix weight ratio of 1.913/1.0, had an initial viscosity of 20,500 mPa·s at 25° C. showing the utility of the invention.

Example 3 describes the viscosity profile of the formulation described in Example 1. The formulation was heated to 70° C. over a 20-minute period to simulate the solventless laminating process.

| Time (Seconds) | Viscosity (mpa · s) |
|---|---|
| Initial | 750 |
| 200 | 1,000 |
| 400 | 1,500 |
| 600 | 2,000 |
| 800 | 2,750 |
| 1000 | 3,750 |
| 1200 | 4,750 |

This viscosity profile shows the utility of the invention in that less viscous materials enhance the solventless laminating process.

Example 4 describes 180° peel values on various substrates after the laminates have been aged 7 days, with the formulation described in Example 2.

| Substrates | Grams |
|---|---|
| Polyester/Aluminum Foil (2.0 mils/1.0 mils) | 800 grams |
| Polyester/Polyester (2.0 mil/2.0 mil) | 700 grams |
| Polyester/Polyethylene (48 ga/1.5 mil) | Substrate Failure |
| Polypropylene/Polypropylene (1.0 mil/75 ga) | Substrate Failure |
| Polypropylene/Metallized Polypropylene (1 mil/70 ga) | Substrate Failure |
| Polyethylene/Polyethylene (1.5 mil) | Substrate Failure |
| Polypropylene/Polyethylene (1 mil/1.5 mil) | Substrate Failure |

Comparative Data

Example 5 describes the preparation and properties of a solvent-free two-component polyurethane adhesive described in European Application # 93114668.2 (Bayer AG).

To a dry container was charged 100.0 grams (0.2493 hydroxyl equivalence) Baycoll® AS1155 which is a polyester polyol from Bayer Corporation based on 1,6-hexanediol, trimethylolpropane, isophthalic acid, adipic acid, phthalic acid and 240.0 grams (0.3429 hydroxyl equivalence) KA8585 which is a NCO-terminated polyurethane prepolymer from Bayer Corporation based on polypropylene glycol and toluene diisocyanate. The formulation had an initial viscosity of 60,000 mPa·s at 25° C. Higher viscosity materials are difficult to meter-mix and process on solventless laminators run at high line speeds.

What is claimed is:

1. A laminating adhesive comprising a reaction product of
   A) at least one polymeric polyol (part A) comprising a condensation product of:
      1) at least one alkylene diol;
      2) at least one diol containing a pendant aliphatic chain; and
      3) at least one dicarboxylic acid; with
   B) at least one NCO-terminated polyurethane prepolymer (part B) comprising a reaction product of:
      1) at least one polyether polyol; and
      2) at least one polyisocyanate;
   wherein said laminating adhesive exhibits an initial viscosity of less than about 25,000 mPa.s at 25° C.±5.0° C.

2. The laminating adhesive of claim 1, wherein said part A exhibits an initial viscosity of less than about 25,000 mPa.s at 25° C.±5.0° C.

3. The laminating adhesive of claim 1, wherein said part B exhibits an initial viscosity of less than about 25,000 mPa.s at 25° C.±5.0° C.

4. The laminating adhesive of claim 1, wherein said at least one alkylene diol in part A has a hydroxyl number of from about 950 to about 1250.

5. The laminating adhesive of claim 1, wherein said at least one pendant aliphatic chain containing diol in part A has a hydroxyl number of from about 950 to about 1250.

6. The laminating adhesive of claim 1, wherein the equivalence ratio of hydroxyl component (part A) to isocyanate component (part B) is in a range of from about 1.0:1.0 to about 1.0:1.8.

7. The laminating adhesive of claim 1, wherein said part B has residual isocyanate monomer of less than about 0.1% by weight, based on 100 parts total part B solids.

8. The laminating adhesive of claim 1, wherein said at least one alkylene diol in part A is present in an amount of from about 5.0% by weight to about 25.0% by weight, based on 100 parts total part A solids.

9. The laminating adhesive of claim 1, wherein said at least one pendant aliphatic chain containing diol in part A is present in an amount of from about 5.0% by weight to about 50.0% by weight, based on 100 parts total part A solids.

10. The laminating adhesive of claim 1, wherein said at least one dicarboxylic acid in part A is present in an amount of from about 50.0% by weight to about 85.0% by weight, based on 100 parts total part A solids.

11. The laminating adhesive of claim 1, wherein said part B has a percent isocyanate of from about 5.0% by weight to about 10.0% by weight, based on 100 parts total part B solids.

12. The laminating adhesive of claim 1, wherein said at least one alkylene diol in part A is chosen from 1,4-butanediol, 1,6-hexnaediol, or mixtures thereof.

13. The laminating adhesive of claim 1, wherein said at least one pendant aliphatic chain containing in part A is chosen from 2,2methyl-1,3-propanediol, meopentyl glycol, or mixtures thereof.

14. The laminating adhesive of claim 1, wherein said at least one dicarboxylic acid in part A Is chosen from aliphatic polycarboxylic acids, cycloaliphatic polycarboxylic acids, aromatic polycarboxylic acid, or mixtures thereof.

15. The laminating adhesive of claim 14, wherein said at least one dicarboxylic acid in part A is chosen from adipic acid, isophthalic acid, or mixtures thereof.

16. The laminating adhesive of claim 1, wherein said at least one polyisocyanate is chosen from linear aliphatic polyisocyanates, branched aliphatic polyisocyantes, cyclic aliphatic polyisocyanates, aromatic polyisocyanates, or mixtures thereof.

17. The laminating adhesive of claim 16, wherein said aromatic polyisocyanates comprises toluene diisocyanate.

18. A laminated article comprising at least two substrates bonded with the laminating adhesive of claim 1.

19. The laminated article of claim 18, wherein at least one of said substrates is chosen from paper, wood, metal, plastic, or synthetic polymers.

* * * * *

UNITED STATES PATENT AND TRADEMARK OFFICE
CERTIFICATE OF CORRECTION

PATENT NO. : 6,994,909 B2  
APPLICATION NO. : 10/465244  
DATED : February 7, 2006  
INVENTOR(S) : Brian S. Glasbrenner It is certified that error appears in the above-identified patent and that said Letters Patent is hereby corrected as shown below:

In the claims:

Column 6, line 42, "1,6-hexnaediol" should be --1,6-hexanediol--.

Column 6, line 45, "meopentyl glycol" should be --neopentyl glycol--.

Signed and Sealed this

Fifth Day of September, 2006

JON W. DUDAS  
*Director of the United States Patent and Trademark Office*